United States Patent
Chu et al.

(10) Patent No.: US 9,363,175 B2
(45) Date of Patent: Jun. 7, 2016

(54) SUB-1GHZ MAC FRAME HEADER COMPRESSION

(71) Applicant: STMicroelectronics, Inc., Coppell, TX (US)

(72) Inventors: Liwen Chu, San Ramon, CA (US); George A. Vlantis, Sunnyvale, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 665 days.

(21) Appl. No.: 13/710,298

(22) Filed: Dec. 10, 2012

(65) Prior Publication Data

US 2013/0155952 A1     Jun. 20, 2013

Related U.S. Application Data

(60) Provisional application No. 61/576,908, filed on Dec. 16, 2011.

(51) Int. Cl.
*H04W 28/06*    (2009.01)
*H04L 12/741*   (2013.01)
*H04L 29/06*    (2006.01)
*H04W 84/12*    (2009.01)

(52) U.S. Cl.
CPC ............... *H04L 45/74* (2013.01); *H04W 28/06* (2013.01); *H04L 69/04* (2013.01); *H04W 84/12* (2013.01)

(58) Field of Classification Search
CPC ....... H04L 45/74; H04L 69/04; H04W 28/06; H04W 84/12
See application file for complete search history.

(56) References Cited

U.S. PATENT DOCUMENTS

| | | | |
|---|---|---|---|
| 2012/0087358 A1* | 4/2012 | Zhu et al. | 370/338 |
| 2013/0022032 A1* | 1/2013 | Taghavi Nasrabadi et al. | 370/338 |
| 2013/0044877 A1* | 2/2013 | Liu et al. | 380/270 |
| 2013/0128808 A1* | 5/2013 | Wentink et al. | 370/328 |
| 2013/0128809 A1* | 5/2013 | Wentink et al. | 370/328 |

\* cited by examiner

*Primary Examiner* — Andrew Lai
*Assistant Examiner* — M Mostazir Rahman
(74) *Attorney, Agent, or Firm* — Allen, Dyer, Doppelt, Milbrath & Gilchrist, P.A.

(57) ABSTRACT

Methods and systems are disclosed specifying the arrangement and content of the fields in data and management frames, which allow for greater payload efficiency in frame-based communication networks. The content of the fields is changed from the standard 802.11 arrangement to meet of the needs of networks such as Sub-1 GHz networks, including those of the 802.11ah standard, and sensor networks with a large number of stations transmitting at low data rates. In some embodiments, MAC header fields are reduced from standard 802.11 header fields by using only two fields for addressing and eliminating standard fields that are not used in sensor networks.

28 Claims, 7 Drawing Sheets

| BITS | 2 | 2 | 4 | 1 | 1 | 1 | 1 | 1 | 1 | 1 | 1 |
|---|---|---|---|---|---|---|---|---|---|---|---|
| | PROTOCOL VERSION | TYPE | SUBTYPE | TO DS | FROM DS | MORE FRAGMENTS | RETRY | POWER MANAGEMENT | MORE DATA | PROTECTED FRAME | ORDER |
| | B0 | B2 B3 | B4 B7 | B8 | B9 | B10 | B11 | B12 | B13 | B14 | B15 |

FRAME CONTROL FIELD

*Fig. 2*

| STF | LTF | SIG | LTFS | DATA (MPDU OR A-MPDU) |
|---|---|---|---|---|
| (2 SYMBOLS) | (2 SYMBOLS) | (2 SYMBOLS) | (1 SYMBOL PER LTF) | |

PHY SIG IN PPDU

*Fig. 3*

COMPRESSED DATA FRAME HEADER FIELDS

| BITS | 2 | 1 | 3 | 1 | 1 | 1 | 1 | 1 | 1 | 4 |
|---|---|---|---|---|---|---|---|---|---|---|
| | PROTOCOL VERSION | TYPE | SUBTYPE | FROM DS | MORE FRAGMENTS | POWER MANAGEMENT | MORE DATA | PROTECTED FRAME | EOSP | TBD |

FRAME CONTROL FIELD

| BITS | 2 | 1 | 4 | 1 | 1 | 1 | 1 | 1 | 1 | 3 |
|---|---|---|---|---|---|---|---|---|---|---|
| | PROTOCOL VERSION | TYPE | SUBTYPE | FROM DS | MORE FRAGMENTS | POWER MANAGEMENT | MORE DATA | PROTECTED FRAME | EOSP | TBD |

FRAME CONTROL FIELD

*Fig. 8*

SUB-1GHZ MAC FRAME HEADER COMPRESSION

CROSS-REFERENCE TO RELATED APPLICATION

This application claims the benefit of U.S. Provisional Application Ser. No. 61/576,908, filed Dec. 16, 2011. The disclosure of the foregoing United States patent application is specifically incorporated by reference herein in its entirety for all purposes.

BACKGROUND OF THE INVENTION

1. Field of the Invention

The present invention relates, in general, to methods and systems of communication networks, especially methods for efficiently transmitting medium access control (MAC) header data by devices of the network. More particularly, the invention relates to (but is not limited to) wireless communication networks operating in the Sub-1 GHz band, especially networks using the emerging IEEE standard 802.11ah.

2. Relevant Background

Many types of communication networks, both wired and wireless, transmit and receive packets of data by organizing transmitted signals into frames for coordination, synchronization and relaying of the transmissions. Ethernet is an example of a wired protocol for such signaling; examples of wireless networks include systems using the 802.11 protocols. One advantage to frames is to allow multiple devices to access to the same physical medium. But a disadvantage is that extra information, such as intended recipient, frame type, etc., must also be transmitted with the desired end user data in order to accomplish the coordination, synchronization and relaying. In many cases, such as with Ethernet and current 802.11 systems, this overhead information imposes a relatively light burden because data carrying frames often carry quite a bit of data, and the system uses a high proportion of such data carrying frames.

But in some systems which transmit relatively small amounts of data, on a less frequent basis, on channels (wired or wireless) with limited bandwidth, the overhead information can impose a large burden. An example of such a system is a wireless sensor network, with a large number of sensors. An IEEE 802.11 BSS or Wi-Fi system typically has a central device to communicate with perhaps tens of nearby users, each needing large data volumes (e.g., for viewing video, web pages, etc.) over time periods of seconds or less. In contrast, a sensor network could have hundreds, perhaps thousands, of widely dispersed sensors, each needing to send or receive small amounts of data to a central device, within time periods of minutes or even days. The amount overhead information needed to be sent with each frame, just for correct addressing of so many users, could seriously degrade the sensor network's capabilities.

To address this problem, as well as for efficient use of the radio spectrum, the Institute of Electrical and Electronic Engineers (IEEE) created Task Group ah (TGah) to develop standards so that wireless networks can transmit in a frequency band of 902 MHz to 928 MHz, called the Sub-1 GHz band. An advantage of this band is that greater range can be achieved. Also, there is typically less interference from intervening objects.

A third advantage of the Sub-1 GHz band is that no legacy systems with different protocols need to be accommodated. So communication systems and devices for this band can be designed to optimize overhead efficiency, rather than to optimize interoperability. In particular, the overhead information included in a transmitted frame can be reduced. In frame-based communication systems, the actual data packet to be transmitted to the receiving station and end user, called the payload, is included with other needed information, called header data. The header data allows the radio receiver to find the start of the frame, to determine the addressee of the payload, to check for errors, and to perform other system operations. Current standard communication protocols specify how the frames are to be structured into fields, which are often further structured with subfields. Also, for effective coordination of the system, some frames are designed only to send information for control and coordination of the transmissions, such as scheduling of transmission times by the various system devices. For example, in the 802.11 standards, there are three types of frames: control, data and management. The detailed terminology of frames and frame-based communications are specified in the standard IEEE 802.11-2012. The standard is cited as a reference for terminology and background information about frame transmission, and does not imply that the communication networks of this disclosure necessarily use the physical wireless transmission methods described therein.

FIG. 1 shows standard arrangements of data and management frames known from the IEEE 802.11a/b/g/n standards. In a data frame, the header consists of up to ten fields with a total size of 36+4 octets (or bytes). The Frame Control field conveys information on signaling and the type of frame being sent. Typically three MAC address fields, and sometimes four, are needed to distinguish the source device of the data, the data's destination device, and possible intermediate transmitter and receiver devices. The QoS, HT Control, Duration/ID fields convey information for coordinating channel access among the devices in the network. Finally, a Frame Check Sequence field typically includes the bits of a Cyclic Redundancy Check code used to ensure the frame header fields have been received correctly. The header of a management frame comprises many of the same fields, and three MAC address fields. The current inventions implement methods and systems for reducing this inefficiency.

GLOSSARY AND ACRONYMS

As a convenient reference in describing the invention herein, the following glossary of terms is provided. Because of the introductory and summary nature of this glossary, these terms must also be interpreted more precisely by the context of the detailed description in which they are discussed.
ACK Acknowledgement
AID Association Identifier
AP Access Point
CH Compressed Header
CH_MAC Compressed Header Medium Access Control
CRC Cyclic Redundancy Check
DA/SA/RA Destination Address/Source Address/Receiver Address
DS Distribution System
EOSP End of Service Period
FCS Frame Check Sequence
FHC Frame Header Compression
HT High Throughput
HTC High Throughput Control
LTF Long Training Field
MAC Medium Access Control
MMPDU MAC Management Protocol Data Unit
MPDU MAC Protocol Data Unit
MSDU MAC Service Data Unit PLCP Physical Layer Convergence Procedure
PPDU PLCP Protocol Data Unit
RA Receiver Address
RD Reverse Direction
RDG Reverse Direction Grant
SIG Signal
STA Station
STF Short Training Field
TA Transmitter Address
TDLS Tunneled Direct-Link Setup
TIM Traffic Identification Map
VHTC Very High Throughput Control

SUMMARY OF THE INVENTION

The exemplary embodiments disclosed herein are methods for use in, and systems of, communication networks, and specify forms of header information and fields of management and data frames, and which specify how and when communication networks can use these forms of headers. In certain embodiments, the header fields are reduced in size from the analogous fields specified in the 802.11a/b/e/g/n standards, and some of those standard fields are removed.

In a first family of embodiments, methods and systems are presented for using frame-based communications within a network in which an access point (AP) device communicates directly with other station (STA) devices, in a point-to-multipoint topology. The AP and the STAs form a basic service set (BSS). Data frames which carry end user data have compressed header fields, totaling at most 16 octets. Two fields of a data frame are used for addressing and routing: a 2-octet association identifier/compressed header field (AID/CH), and a BSS identifier (BSSID) field of 6 octets. In a preferred embodiment, the AID/CH field comprises an AID subfield which identifies the STA corresponding to the frame, and a CH Identifier subfield which represents additional compressed information, e.g. the Address 3 (DA or RA) of the frame. The matching between CH Identifier and the additional compressed information is established between a station and the AP through frame header compression negotiation.

In further embodiments, a data frame comprises a Frame Control field, a Sequence Control field, and a Quality of Service (QoS). In a preferred embodiment the lengths of these fields are respectively 2 octets, 1 octet, and 1 octet. In another embodiment, a data frame comprises a Frame Check Sequence (FCS) field, which can be used to provide error correction capabilities. In one embodiment the FCS has 4 octets, and in another embodiment it has 2 octets. In the latter case the FCS can comprise a two octet cyclic redundancy check code, such as a CRC-16-CCITT.

In order to compress more information in a frame header, a second family of embodiments discloses methods and systems in which the AP and the STAs can transmit signals to negotiate whether compressed headers can be used for transmission of a data frame. A CH Identifier (e.g. 3-bit length) can be used to indicate source or destination MAC address. In one embodiment, a CH Identification Request frame is transmitted from a STA (or from the AP) that would like to send a subsequent data frame using compressed header fields to the AP (respectively, to a STA). The CH Identification Request frame preferentially comprises a Category field, an Action Value field, a Dialog Token field, and at least one pair of fields, the pair of fields comprising a CH Identifier field of 1 octet and a DA/SA MAC address field of 12 octets. A further embodiment also comprises a CH Identification Response frame, of size at most 5 octets.

In a third family of embodiments, methods and systems are presented for using frame-based communications within a network in which an AP device communicates directly with other STAs, in a point-to-multipoint topology. In this family of embodiments, management frames, which transmit management information for network services, have compressed header fields, totaling at most 16 octets. Two fields of a management frame are used for addressing and routing: a 2-octet association identifier/compressed header field (AID/CH), and a Basic Service Set Identifier (BSSID) field of 6 octets. In a preferred embodiment, the AID field identifies the STA corresponding to the frame.

In further embodiments, the header fields of a management frame comprise a Frame Control field, a Sequence Control field and a FCS field. In a preferred embodiment, the Frame Control field uses 2 octets, and the Sequence Control field uses 1 octet. In two further embodiments the FCS uses either 2 or 4 octets, and can be used to convey error detection and correction information, often using cyclic redundancy check coding.

In two further families of embodiments, the Frame Control field of a data frame or a management frame is used for conveying information regarding whether compressed headers are being used. In the first of these families, either a new Protocol Version bit set (in the Protocol Version field) is used, or else a new Type and SubType value combination in the Type and SubType subfields is used. In the second of these families, a From DS field (indicating whether the frame is to/from a Distribution System) is created within the Frame Control field to convey the order of the BSSID and AID fields within the compressed header fields.

BRIEF DESCRIPTION OF THE DRAWINGS

The figures described below illustrate exemplary embodiments of the invention, and do not limit the scope of the claims.

FIG. 2 shows a standard organization of subfields in a Frame Control Field.

FIG. 3 shows a standard organization of the fields in a Physical Layer Convergence Procedure Protocol Data Unit, including the SIG field.

FIG. 8 shows two embodiments of the Frame Control field of the compressed header management frame, according to embodiments of the invention.

DETAILED DESCRIPTION OF THE PREFERRED EMBODIMENTS

In the description and claims that follow, the word "a" or "an" preceding an element does not exclude the presence of a plurality of such elements.

Many types of communication networks have an architecture in which devices in the network communicate through one device, called an access point (AP). The AP is often connected to another network, such as the internet. The other devices in the network, called stations (STAs), route most or all of their transmissions through the AP. As discussed above, for transmissions to be coordinated and sent to the correct device, the information to be transmitted is often broken into packets and the packets of digital data are sequentially encapsulated with other data for addressing and synchronization. The combination is called a frame.

Figure 1:
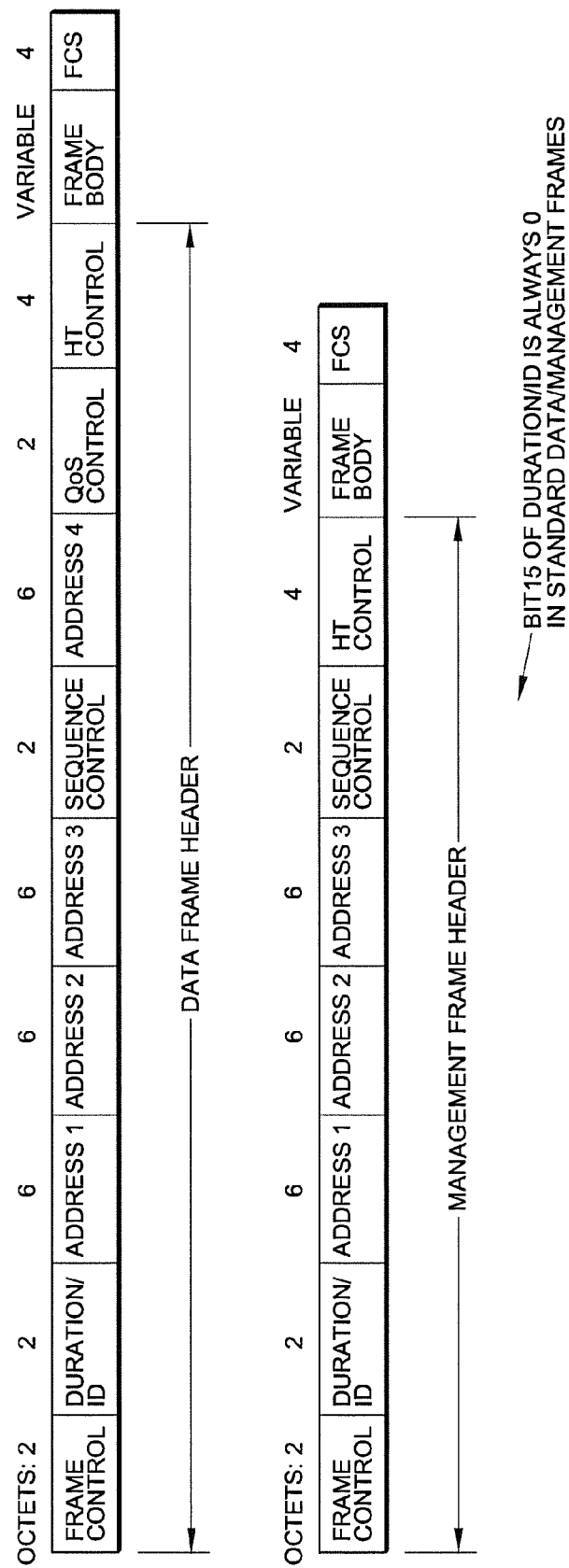
FIG. 1 shows a standard organization of the MAC header fields of data and management frames, as known in the art.

Examples of such frame-based communications networks are specified in the standards 802.11. These standards specify three types of frames: data, management and control frames. FIG. 1 shows the structure of how information is encapsulated into the first two types of frames, according to these standards. The Frame Body contains a packet of the information that a STA or AP wishes to transmit. The other components of the frames, called fields or elements, are of specified length (in octets, also called bytes), and contain the necessary extra information needed for routing the information and coordinating transmissions within and out of the network. This extra information is called medium access control (MAC) header information, and the extra fields are called frame header fields. The entire frame is termed the MAC Protocol Data Unit (MPDU). As shown in FIG. 3, the entire MPDU is itself enclosed in a Physical Layer Convergence Procedure Protocol Data Unit (PPDU), which is used for physical synchronization of the transmitter and receiver. In some cases, multiple MPDSUs are transmitted in the data field of FIG. 3; these are Aggregated MPDUs (A-MPDU). FIG. 2 shows a standard arrangement of the subfields of the Frame Control field. The standards are cited as a reference for terminology and background information about frame transmission, and do not imply that the communication networks of this disclosure necessarily use the physical wireless transmission methods described therein.

There are situations where it is desirable to use the general structure of such a frame-based communication network, but where it would be inefficient to include all the detailed information included in all the fields of FIG. 1. An example of such a situation is in a wireless sensor network, particularly for one using the Sub-1 GHz band. In the United States, this band is 902 MHz to 928 MHz. For such a network, efficiency of transmission is of primary importance for a variety of reasons: the bandwidth is limited, STAs (e.g., a sensor) typically need to transmit and receive only small amounts of data on an intermittent basis, and there may be upwards of thousands of STAs. Finally, in the case of networks using the Sub-1 GHz band, backwards compatibility with 802.11a/b/g/n is not needed.

The exemplary embodiments detailed herein improve transmission efficiency in a frame-based communication network by allowing the use of a compressed set of frame header fields. Other embodiments specify signaling processes by which STAs and the AP can negotiate whether to use such a compressed frame header format.

Address fields of a data frame in the 802.11 standards are the Receiver Address (RA), Transmitter Address (TA), Source Address (SA), and the Destination Address (DA). The Address fields of a management frame in the 802.11 standards are Address 1 (RA), Address 2 (TA), and Address 3. All are 6-octet MAC addresses. The AID can be used to identify the STA. The RA and TA of a frame are always used to identify the receiver and the transmitter in the BSS. The SA and DA are used to identify the source or the destination of the frame which may be outside the BSS. Once a STA is associated with an AP, the AP will allocate an Association Identifier (AID) to the STA. The AID can be used to replace the MAC address in MAC header fields.

In a sensor network, only limited amounts of data will need to be transmitted between the AP and the STAs, and the AP will coordinate communication with any distribution system (DS). Using all four address fields of a data frame would not be necessary in a data frame within a sensor network, especially from a STA to the AP. STAs, and APs, only need to send enough information in the header fields so the intended receiver knows the frame is intended for it. Some fields/subfields in standard MAC headers also might not be required for some cases, e.g. TXOP Limit/QueueSize subfields, Address 3 in a management frame. Further, some fields/subfields can be compressed. The transmitter or the receiver of a frame can be identified by the AID of the transmitter or the receiver. By removing some fields/subfields in a frame header and compressing some fields/subfields, the MAC overhead can be decreased. One such embodiment is to transmit only one AID to replace the TA and RA, and one MAC address in the header fields.

Figure 4:
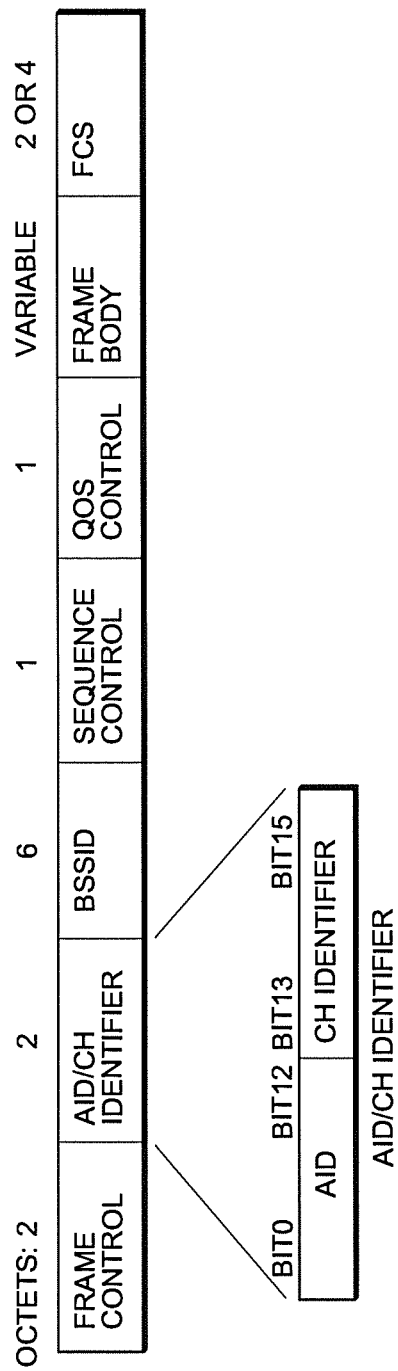
FIG. 4 shows the organization of the fields and subfields in compressed header data frames, according to embodiments of the invention.

FIG. 4 shows a particular embodiment of a compressed set of MAC frame header fields, to be used with data frames, according to the present invention. The transmitter and the receiver of the data frame are not identified by two MAC Addresses. Instead, a MAC address Basic Service Set Identifier (BSSID) field, comprising the AP's MAC address, of 6 octets, and one AID field, of 2 octets, is used to identify the transmitter and the receiver. The BSSID field is used to identify whether the frame is in the same BSS. The BSSID is also used to avoid wrong reception of the frames. For example, when a STA in another BSS with the same AID as the AID in the compressed data frame receives the compressed data frame, the STA will discard the frame. The reason is that the BSSID in the frame is not the same as the BSSID of the AP that the STA is associated with.

A data frame includes a Frame Control field, as is known in the art, and shown in FIG. 2. Two subfields can be used with the compressed header format just described. In one embodiment, if the From DS bit is 1 and the To DS bit is 0, the BSSID is the transmitter identifier and AID is the receiver identifier. When "From DS" bit is 0 and the "To DS" bit is 1, the BSSID is the receiver identifier and the AID is the transmitter identifier. But when the "From DS" bit in Frame Control field is 1 and the "To DS" bit in Frame Control field is also 1, the compressed header is not used. In this embodiment, tunneled direct link setup (TDLS) is not to be used.

In another embodiment, a final Frame Check Sequence (FCS) field is included among the compressed data frame headers to implement correction of possible transmission errors of the bits in the frame. A preferred embodiment is to use a cyclic redundancy check (CRC) error correcting code. Using a 4-octet CRC is known in the art, and can be used in the present embodiments. But since in the embodiment shown in FIG. 4 the size of the header fields is reduced, the FCS can use a shorter, 2-octet, CRC code, such as the 16-CRC-16-CCITT.

To signal whether the data frame is normal or compressed, a number of options are possible. In a first embodiment, a new protocol version in the Protocol Version subfield can be used. Presently, 00 is the protocol version used by the non-compressed frame. A non-compressed data frame will never include the new protocol version in the frame's Protocol Version subfield. Once a data frame includes the new protocol version in Protocol Version subfield, the frame is a compressed frame. In a second embodiment, one bit in the signal (SIG) field of the Physical (PHY) Layer Convergence Procedure (PLCP) frame, shown in FIG. 3, can be used. A non-compressed data frame will set the selected bit in the signal (SIG) field of the PLCP to 0. Once a data frame sets the selected bit in the SIG field of the PLCP to 1, the frame is a compressed frame. In a third embodiment, a new MPDU Type/SubType value combination in the Type and SubType subfields can be used. A non-compressed data frame will never include the new MPDU Type/SubType value combination in the frame's Type and SubType subfields.

In networks with at most 6000 STAs in a BSS, such as in a network of 802.11ah, 13 bits suffice to indicate the AID. Then in the field there are still 3 bits left in a 2-byte field. The three remaining bits can be used to identify the source or the destination of the frame that was originally identified by 6-byte SA and 6-byte DA. This can further decrease the frame header length. The field can be named as AID/CH identifier field, and includes 13-bit AID and 3-bit CH identifier. A particular embodiment is shown in FIG. 4. In this embodiment, in the case that From DS subfield in the Frame Control field is 0, and the To DS subfield is 1, then bits 13 to 15 (inclusively) are the DA identifier. In the case that the From DS subfield is 1, and the To DS subfield is 0, then bits 13 to 15 (inclusively) are the SA identifier. As described below, CH Identification Request/Response action frames are used to match the CH Identifier to the DA/SA MAC address. The 3-bit SA/DA identifier is normally enough since for a given RA/TA pair (one STA and its associated AP), the possible SAs or DAs are the STA, edge router/bridge, AAA server, policy server, or signup server.

Figure 5:
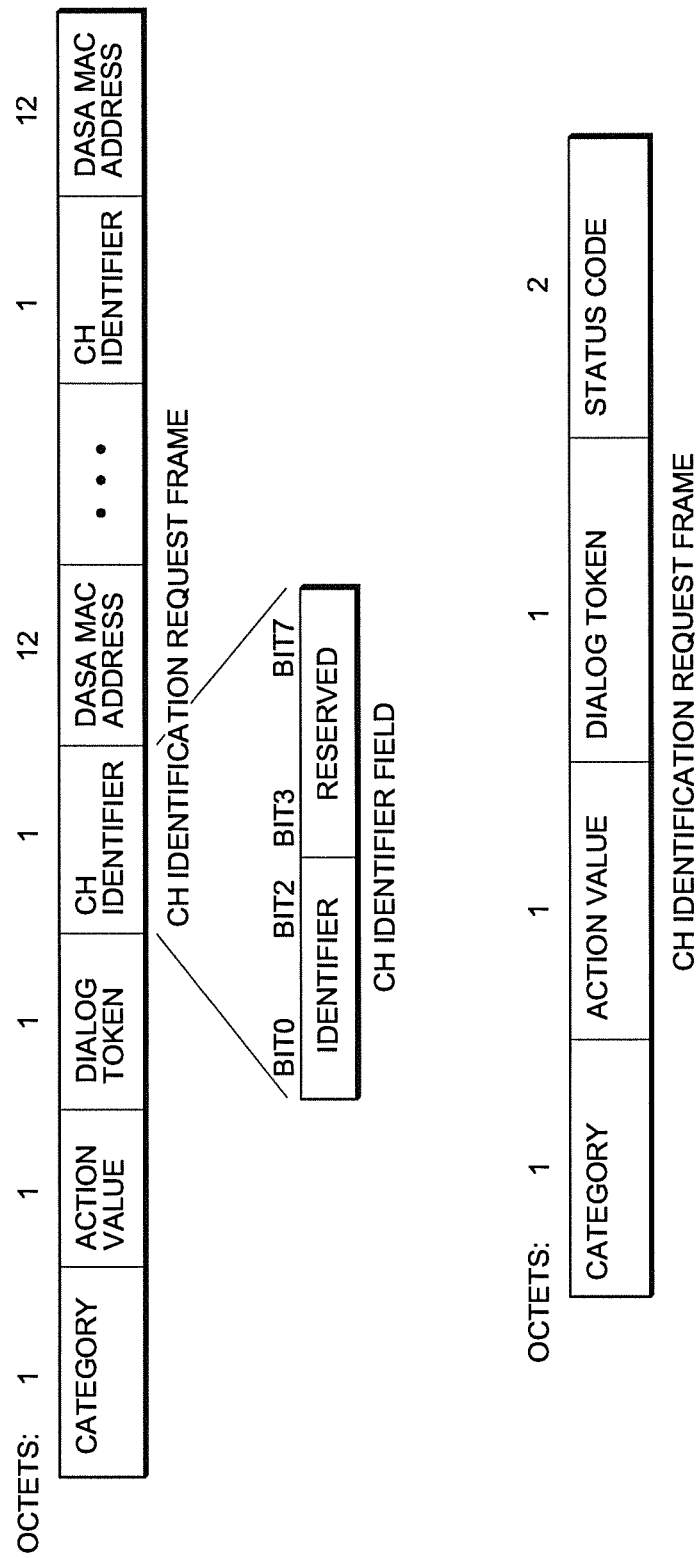
FIG. 5 shows an organization of the fields and subfields of a CH Identification Request frame, and the fields of a CH Identification Response frame, according to embodiments of the invention.

To manage DA/SA Identification, a non-AP STA sends a CH Identification Request action frame to the AP to indicate the mapping between CH Identifiers and DA/SA MAC Addresses. An embodiment of such frame is shown in FIG. 5. At most eight pairs of CH Identifiers and DA/SA MAC Addresses can be included. After receiving a CH Identification Request frame, the AP sends a CH Identification Response frame to acknowledge the mapping between a CH Identifier and a DA/SA MAC Address. An embodiment of such a CH Identification Response frame is also shown in FIG. 5.

Figure 6:
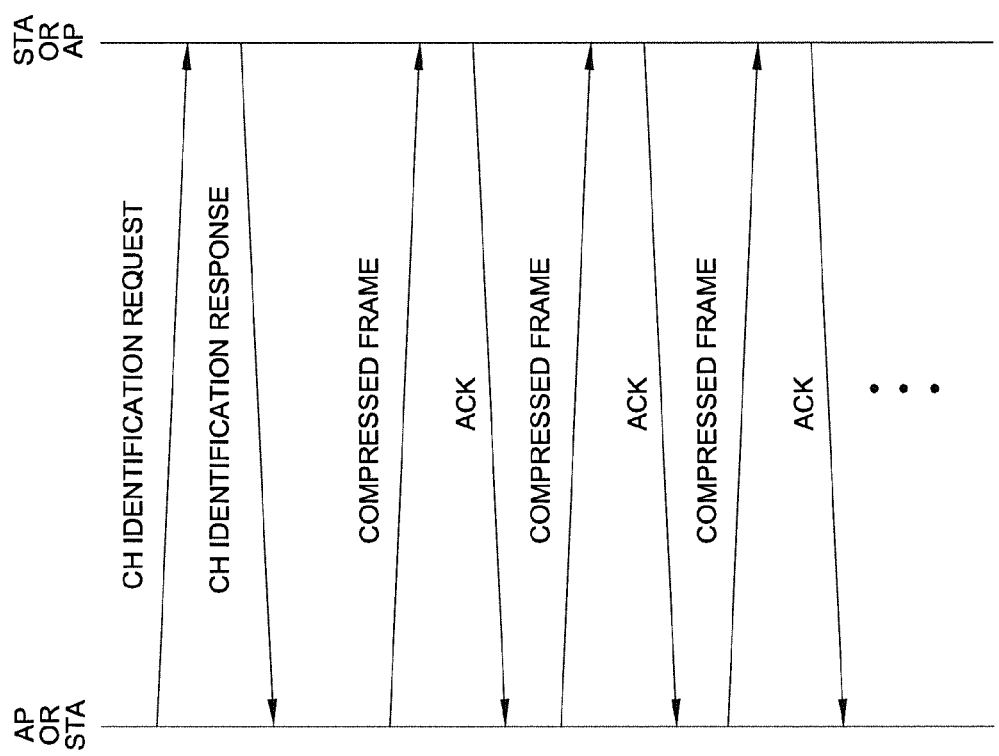
FIG. 6 shows a signaling process by which a transmitter (either a STA or an AP) negotiates use of compressed MAC header formats for data frames with a receiver (respectively, either an AP or a STA), according to embodiments of the invention.

FIG. 6 illustrates the signaling of the CH Identification Request and the CH Identification Response messages.

The Duration/ID field in standard 802.11 frames carries the remaining duration of the transmit opportunity (TXOP). A STA that receives the frame will not try to contend the wireless medium (count down the backoff timer or transmit the frames when the backoff timer becomes to 0) during the remaining TXOP. This can avoid collisions even if the STA can't detect the following acknowledge frame. 802.11ah adds a 2-bit ACK Indication in the SIG field. With the ACK Indication help, a neighbor STA that receives the frame but can't detect the acknowledgement will not try to contend for the wireless medium access during the transmission of the acknowledgement. Because a 2-bit ACK Indication is added to the SIG field PHY layer fields, the Duration/ID field can be eliminated. A 2-octet QoS Control field in non-compressed frames includes various subfields: 3-bit TID, End of Service Period (EOSP), 2-bit ACK Policy, 1-bit A-MSDU Present, and 8-bit TXOP Limit/Queue Size. The EOSP, 1-bit A-MSDU Present, and 8-bit TXOP Limit/Queue Size subfields can be removed from compressed frames since they are not important to the compressed frame. In a further embodiment, the QoS Control field is reduced to 1 octet, and in a preferred embodiment, 4 bits of it are used to indicate the Traffic Identification Map (TID) of the frame, 2 bits are used to indicate the acknowledgement policy (ACK), and the other bits are reserved. A 2-octet Sequence Control field in non-compressed frames can help the receiver detect a duplicate frame. Given that a sensor STA has lower data rate, a one-octet Sequence Control field is long enough to detect a duplicate frame. So in another embodiment, a single octet Sequence Control field is used.

Figure 7:
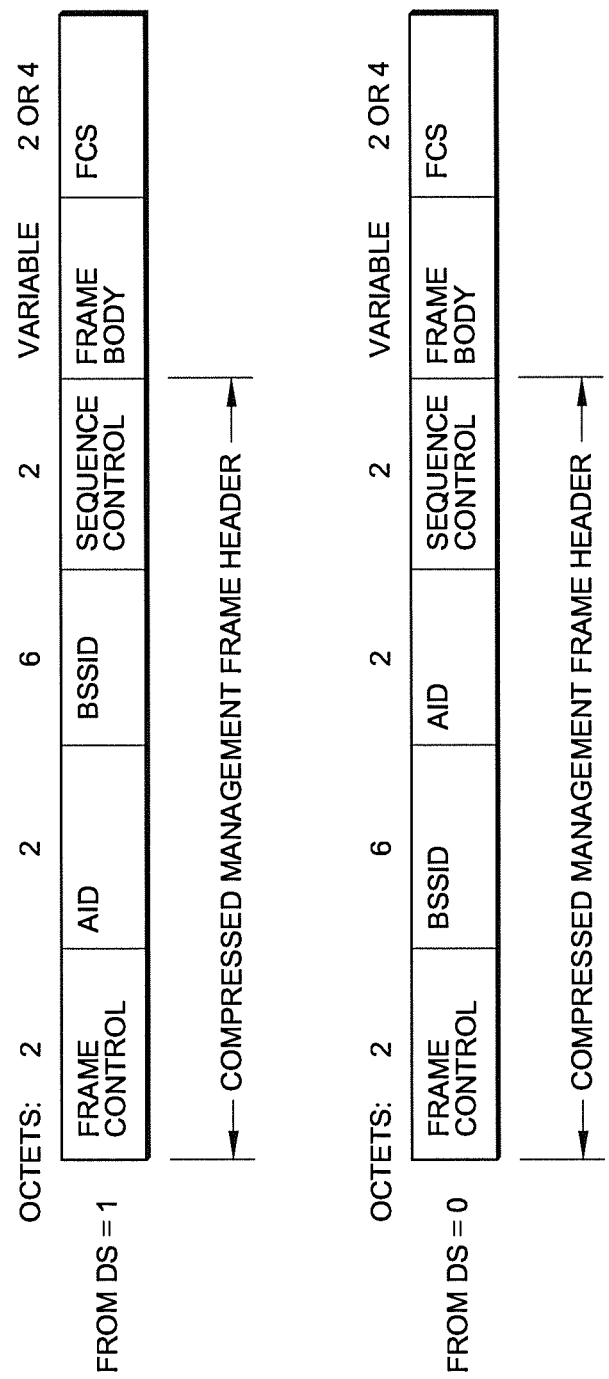
FIG. 7 shows compressed header MAC fields for management frames, according to embodiments of the invention.

Other families of embodiments use the Compressed Management Frame Header fields shown in FIG. 7. By using a reduced set of frames for the header fields, greater transmission efficiency can be achieved. The Address3, Duration, and HT Control field are removed from standard management frame header fields shown in FIG. 1 to make the compressed MAC header of FIG. 7. The HT control field can be removed to make the compressed management MAC header. This means that the compressed frame will not do the functionality related with HT Control fields. As stated above, 802.11ah adds a 2-bit ACK Indication in the SIG field PHY layer fields. With the ACK Indication help, a neighbor STA that receives the frame but can't detect the acknowledgement will not try to contend the wireless medium during the transmission of the acknowledgement. So the Duration/ID field can be eliminated since a 2-bit ACK Indication is added to the SIG field PHY layer fields. Only one Address field, of size 6 octets, and one AID field, of size 2 octets, are used to identify the transmitter and the receiver. In some known methods, a STA uses Address3 to decide whether a group management frame should be accepted. Given that the TA is the same as Address3 in group management frames, it is safe to remove Address3 to make the compressed management frames. The remaining fields of the Compressed Management Frame Header fields comprise a Frame Control (2 octets), a Sequence Control field (2 octets) and a Frame Check Sequence field (either 2 or 4 octets).

In one embodiment, the AID field is used to identify the destination of the management frame. This embodiment is used when the From DS subfield in the Frame Control field is 1.

In another embodiment, the AID field is used to identify the source of the management frame. This embodiment is used when the From DS subfield in the Frame Control field is 0.

Different embodiments involve variations in the information carried in the Frame Control field.

In one family of embodiments, the Frame Control field comprises a Type and a SubType Field.

To signal whether the management frame is normal or compressed, a number of options are possible. In one embodiment, a new protocol version in the Protocol Version subfield can be used. A non-compressed management frame will never include the new protocol version in the frame's Protocol Version subfield. Once a management frame includes the new protocol version in Protocol Version subfield, the frame is a compressed frame. In another embodiment, one bit in the signal (SIG) field of the Physical (PHY) Layer Convergence Procedure (PLCP) frame can be used. A non-compressed management frame will set the selected bit in the signal (SIG) field of the Physical (PHY) Layer Convergence Procedure (PLCP) to 0. Once a management frame sets the selected bit in the signal (SIG) field of the Physical (PHY) Layer Convergence Procedure (PLCP) to 1, the frame is a compressed frame. In a third embodiment, a new MPDU Type/SubType value combination in the Type and SubType subfields can be used. A non-compressed management frame will never include the new MPDU Type/SubType value combination in the frame's Type and SubType subfields.

In some embodiments a final Frame Check Sequence field of 2 or 4 octets is included to implement correction of possible transmission errors of the bits in the compressed header fields. A preferred embodiment is to use a cyclic redundancy check (CRC) error correcting code: CRC-16-CCITT, though other 2 octet codes can be used.

Yet other embodiments reduce the size of, or remove altogether, at least one of the standard 802.11 MAC header fields to form the header fields for data or management frames. As would be apparent based on the explanations and embodiments disclosed above, in a network, such as a sensor network, with an AP and a plurality of STAs directly communicating, the modified and remaining forms of the MAC header fields used to transmit the data or management frame only need to be able to identify the receiver (AP or STA) and the transmitter (respectively the STA or the AP), and whether the frame is being transmitted using the modified header fields.

Although the invention has been described and illustrated with a certain degree of particularity, it is understood that the present disclosure has been made only by way of exemplary embodiments, and that numerous changes in the combination and arrangement of elements will be apparent to those skilled in the art without departing from the spirit and scope of the invention, as hereinafter claimed.

We claim:

1. A method of operating a communication network which comprises an access point (AP) in communication with a plurality of stations (STAs), the method comprising:
   receiving and transmitting information in frames;
   transmitting and receiving a data frame and a management frame by using compressed header medium access control (CH_MAC) fields;
   wherein the CH_MAC fields comprise:
      a Medium Access Control Address (MAC Address) field of 6 octets, and an Association Identifier (AID) field of 2 octets, which are used for identifying the addresses of the transmitter and the receiver of the data frame, and
      other CH_MAC fields of a combined size no more than 8 octets;
   transmitting and receiving Physical Layer Convergence Procedure (PLCP) frames, each comprising a signal (SIG) field, wherein a bit of the SIG field indicates whether the management frame is compressed and another bit indicates whether the data frame is compressed; and
   signaling, by use of action frames transmitted between the STAs and the AP, to negotiate the information that each value of a Compressed Header Identifier (CH Identifier) can match, wherein the action frames comprise a CH Identification Request frame and a CH Identification Response frame.

2. The method of claim 1, wherein 13 bits of the Association Identifier (AID) field are used for AID information and three bits are used as the CH Identifier.

3. The method of claim 1, wherein a field of the CH_MAC fields comprises a Frame Check Sequence (FCS) field, of at most four octets, that contains information for error detection and correction.

4. The method of claim 3, wherein the size of the FCS is two octets.

5. The method of claim 1, wherein a field of the CH_MAC fields comprises a Frame Control field of size 2 octets, comprising a From Distribution System (From DS) subfield and a To Distribution System (To DS) subfield, each of size 1 bit, which are used to identify the transmitter or the receiver.

6. The method of claim 1, wherein the data frame is indicated by a single bit in a SIG field of a Physical layer convergence procedure Protocol Data Unit.

7. The method of claim 1, wherein the data frame is indicated by two bit values included in a Protocol Version subfield of a Frame Control field within the CH_MAC fields.

8. The method of claim 1, wherein the data frame is indicated by values in the Type and SubType subfields of a Frame Control field within the CH_MAC fields.

9. The method of claim 1, wherein the CH Identification Request frame comprises at least one CH Identifier field and an equal number of Destination Address/Source Address Medium Access Control Address (DA/SA MAC Address) fields; and wherein there are no more than eight DA/SA MAC Address fields.

10. A system for a communication network comprising:
   an access point (AP) in communication with a plurality of stations (STAs);
   wherein information communicated between the AP and the STAs is transmitted and received as management frames and data frames;
   wherein a data frame and a management frame are transmitted and received between the AP and the STAs using compressed header medium access control (CH_MAC) fields;
   wherein the CH_MAC fields comprise a Medium Access Control Address (MAC Address) field of 6 octets and an Association Identifier (AID) field of 2 octets for identifying a transmitter and a receiver, and other CH_MAC fields comprising a combined size of no more than 8 octets; and
   wherein a Physical Layer Convergence Procedure (PLCP) frame is transmitted and received, each comprising a signal (SIG) field, a bit of the SIG field indicating whether the management frame is compressed and another bit indicating whether the data frame is compressed, wherein action frames are transmitted between a STA and the AP as signaling to negotiate the information that each value of a Compressed Header Identifier (CH Identifier) can match, the action frames comprising a CH Identification Request frame and a CH Identification Response frame.

11. The system of claim 10 wherein 13 bits of the AID field are used for AID information, and three bits are used as the CH Identifier.

12. The system of claim 10, wherein a field of the CH_MAC fields comprises a Frame Check Sequence (FCS) field, of either 2 or 4 octets, and contains information for error detection and correction.

13. The system of claim 10 wherein a field of the CH_MAC fields comprises a Frame Control field of size 2 octets, comprising a From Distribution System (From DS) subfield and a To Distribution System (To DS) subfield, each of size 1 bit, which are used to identify whether the AID indicates either a transmitter or a receiver.

14. The system of claim 10, wherein the CH Identification Request frame comprises at least one Destination Address/Source Address Identifier (DA/SA Identifier) field and an equal number of Destination Address/Source Address Medium Access Control Address (DA/SA MAC Address) fields; and wherein there are no more than eight DA/SA Identifier fields.

15. A method of operating a communication network which comprises an access point (AP) in communication with a plurality of stations (STAs), the method comprising:
   receiving and transmitting information in frames; and
   transmitting and receiving a management frame and a data frame using compressed header medium access control (CH_MAC) fields;
   wherein the CH_MAC fields comprise:
      a Medium Access Control Address (MAC Address) field of 6 octets and an Association Identifier (AID) field of 2 octets, which are used for identifying either of a transmitter or a receiver, and other CH_MAC fields comprising a combined size of no more than eight octets;

transmitting and receiving Physical Layer Convergence Procedure (PLCP) frames, each comprising a signal (SIG) field, wherein a bit of the SIG field indicates whether the management frame is compressed and another bit indicates whether the data frame is compressed; and signaling, by use of action frames transmitted between the STAs and the AP, to negotiate the information that each value of a Compressed Header Identifier (CH Identifier) can match, wherein the action frames comprise a CH Identification Request frame and a CH Identification Response frame.

16. The method of claim 15, wherein the management frame is indicated by a single bit in a SIG field of Physical layer convergence procedure Protocol Data Unit.

17. The method of claim 16, wherein the CH_MAC fields comprise a Frame Check Sequence (FCS) field, of size at most 4 octets that contains information for error detection and correction.

18. The method of claim 17, wherein the size of the FCS is two octets.

19. The method of claim 15, wherein the management frame is indicated by two bit values included in a Protocol Version subfield of a Frame Control field within the CH_MAC fields.

20. The method of claim 15, wherein the management frame is indicated by values in the Type and SubType subfields of a Frame Control field within the CH_MAC fields.

21. A system for a communication network comprising:
an access point (AP) in communication with a plurality of stations (STAs);
wherein communications between the AP and STAs are organized as management frames and data frames;
wherein management frames and data frames are transmitted and received using compressed header medium access control (CH_MAC) fields comprising a MAC Address field of 6 octets and an Association Identifier (AID) field of 2 octets, which are used for identifying a transmitter and a receiver, and other CH_MAC fields comprising a combined size of no more than 6 octets;
wherein a Physical Layer Convergence Procedure (PLCP) frame is transmitted and received, each comprising a signal (SIG) field, a bit of the SIG field indicating whether the management frame is compressed and another bit indicating whether the data frame is compressed, wherein action frames are transmitted between a STA and the AP as signaling to negotiate the information that each value of a Compressed Header Identifier (CH Identifier) can match, the action frames comprising a CH Identification Request frame and a CH Identification Response frame.

22. The system, of claim 21, wherein the management frame is indicated by a single bit in a SIG field of a Physical layer convergence procedure Protocol Data Unit.

23. The system of claim 21, wherein the management frame is indicated by two bit values included in a Protocol Version subfield of a Frame Control field within the CH_MAC fields.

24. The system of claim 21, wherein the management frame is indicated by values in the Type and SubType subfields of a Frame Control field within the CH_MAC fields.

25. The system of claim 21 wherein the CH_MAC fields comprise a Frame Check Sequence (FCS) field of size, at most 4 octets, that contains information for error detection and correction.

26. The system of claim 25, wherein the size of the FCS is two octets.

27. A method of operating a communication network which comprises an access point (AP) in communication with a plurality of stations (STAs), the method comprising:
receiving and transmitting information in frames; and
transmitting and receiving a data frame and a management frame by using compressed header medium access control (CH_MAC) fields;
wherein the CH_MAC fields comprise 802.11 Medium Access Control (MAC) header fields in which at least one field has been reduced in size from the standard 802.11 MAC header field size; and
wherein the CH_MAC fields comprise 802.11 MAC header fields in which at least one of the standard 802.11 MAC header fields has been removed;
transmitting and receiving Physical Layer Convergence Procedure (PLCP) frames, each comprising a signal (SIG) field, wherein a bit of the SIG field indicates whether the management frame is compressed and another bit indicates whether the data frame is compressed; and
signaling, by use of action frames transmitted between the STAs and the AP, to negotiate the information that each value of a Compressed Header Identifier (CH Identifier) can match, wherein the action frames comprise a CH Identification Request frame and a CH Identification Response frame.

28. The method of claim 27, wherein the CH_MAC fields comprise information to identify the AP and a STA between which the frame is being sent.

* * * * *